United States Patent
Horvath et al.

(10) Patent No.: US 7,403,515 B2
(45) Date of Patent: Jul. 22, 2008

(54) METHOD OF COMMUNICATING BETWEEN A USER AND A NETWORK

(75) Inventors: Ernst Horvath, Vienna (AT); Karl Klaghofer, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 583 days.

(21) Appl. No.: 10/932,304

(22) Filed: Sep. 2, 2004

(65) Prior Publication Data

US 2005/0102421 A1 May 12, 2005

(30) Foreign Application Priority Data

Sep. 8, 2003 (GB) .................... 0320867.5

(51) Int. Cl.
*H04L 12/28* (2006.01)
*H04Q 7/00* (2006.01)
*H04Q 7/24* (2006.01)
*H04Q 7/20* (2006.01)
*H04M 11/04* (2006.01)

(52) U.S. Cl. .............. 370/351; 370/331; 370/338; 370/401; 455/404.1; 455/433; 455/436; 379/45

(58) Field of Classification Search ............. 370/338, 370/401, 328, 351, 331; 455/433, 436, 404.1; 379/45; 709/225
See application file for complete search history.

(56) References Cited

U.S. PATENT DOCUMENTS

| 5,878,347 | A | 3/1999 | Joensuu et al. | |
|---|---|---|---|---|
| 5,898,922 | A | 4/1999 | Reininghaus | |
| 6,604,142 | B1 * | 8/2003 | Bertrand et al. | 709/227 |
| 6,775,255 | B1 * | 8/2004 | Roy | 370/331 |
| 2002/0049059 | A1 | 4/2002 | Muhonen et al. | |
| 2003/0046400 | A1 * | 3/2003 | Friel et al. | 709/228 |
| 2003/0167343 | A1 * | 9/2003 | Furuno | 709/244 |

FOREIGN PATENT DOCUMENTS

| EP | 0 967 769 A | 12/1999 |
|---|---|---|
| EP | 1 030 491 A | 8/2000 |
| EP | 1 372 350 A | 12/2003 |
| GB | 1056256 A2 * | 11/2000 |
| JP | 7030953 | 1/1995 |

* cited by examiner

*Primary Examiner*—Barry W Taylor
(74) *Attorney, Agent, or Firm*—Crowell & Moring LLP

(57) ABSTRACT

A method of communicating between a user and a network, the method comprising registering with a first central control unit in a first area; registering with a second central control unit in a second area; wherein the second registration is valid concurrently with the first registration; defining a set of priorities by which each control unit determines route selection for a call; and routing a call via the first or second control unit accordingly.

16 Claims, 4 Drawing Sheets

– – – – Inter-GK Communication
·············· Registration (e.g. in accordance with ITU-T H.225.0 RAS)

METHOD OF COMMUNICATING BETWEEN A USER AND A NETWORK

This invention relates to method of communicating between a user and a network, in particular to support mobility in internet protocol (IP) networks or for redundancy purposes.

In Voice over IP (VoIP) networks, VoIP terminals log on or register with a central control unit. In networks according to Standard H.323 as described in ITU-T Recommendation H.323 "Packet based multimedia communication systems", this unit is a "Gatekeeper" (GK); in networks according to standard session initiated protocol (SIP) (IETF RFC 3261—Session Initiation Protocol) this unit is a "Registrar". For the purpose of this description, the central control unit is referred to as a Gatekeeper "GK", but the application is not limited to H.323 standard and infact the interface between the central control unit ("GK") and a terminal for log on or registration may be based on proprietary protocols such as CorNet, as well as standardised protocols like H.323 and SIP.

Conventional applications which require mobility of a user or terminal require the terminal to register either with a home GK or with a GK in the visited area or domain. The home GK is the GK in which the subscriber is set up. The features which have been allocated to the subscriber are known to the home GK. Furthermore, all the user's classes of service are known to the home GK. When the user is located in his home area or domain, he is logged on to the home GK. The home GK will be referred to as the "GKH".

When a subscriber and his terminal travel into another area or domain (terminal mobility) or when a subscriber wants to log on to a stationary terminal in a visited area or domain, there are two methods which can be used for terminal registration. In the first, the terminal registers with the remote home GK—GKH. This method is often used when the user or terminal moves into a different area, but is not always inside the same domain. In the second, the terminal registers with the local visited GK—GKV. This method is often used when the user or terminal has moved into a different domain. For H.323 networks, user mobility is according to standard ITU-T Recommendation H.510 "Mobility for H.323 multimedia systems and services".

Both methods have advantages and disadvantages. For registration with GKH the advantages are that the class of service features and other profile entries known to the GKH can be executed, because signalling always takes place via the home GK. However, there are quite a few disadvantages. For every call, even a call to another local subscriber in the visited zone or domain, the routing must be via the GKH. This results in unfavourable signalling connections (also referred to as "trombone connections"). This effect becomes more unfavourable, the further the GKH is located from the GKV. This method results in longer call set-up times, due, for example, to unnecessarily long signalling paths and there is a higher probability of failure of the entire connection between the GKV and GKH, as the number of network elements (e.g. routers) between the GKV and GKH, which are needed for call set-up, increases. A further problem is that in the case of an emergency call, it is possible that an emergency call station in the home zone or domain is contacted, even though the subscriber is actually in a visited zone or domain.

In the case of registration with GKV, the advantages are that there are shorter signalling paths, so no trombone connections; shorter call set-up times due to shorter connection paths; and lower probability of failure of signalling link due to reduced number of network elements needed. Furthermore, an emergency call will be processed by the visited GK, which ensures that the nearest emergency call station in the visited zone or domain is notified. The disadvantages of this method are that generally, the GKV has no detailed knowledge of the user data of the visiting subscriber or terminal, so only default profiles can be used; there are no personalised user interfaces or keypad layouts available; and home GK features are not available. Complete transmission of user profiles, class of service feature and other authorisations (e.g. which subscribers or networks the user may call and the particular subscribers or networks from which the user may accept calls) from the GKH to the GKV is time critical, requires extensive mobility management procedures and adaptation between domain or zones and is therefore usually not implemented.

Both methods have disadvantages as well as advantages and in order to exploit the advantages of one method, one always has to put up with its disadvantages. Currently, there is no means of combining the advantages of these methods whilst excluding their respective disadvantages, so users must simple tolerate the problems.

A method described in the European Telecommunication Standard Institute (ETSI) telecommunications and internet protocol harmonisation over networks (tiphon) describes a method in which both the home and visited Gatekeeper are always involved in all signalling processes, but this results in an undesirable increase in overhead and there is no provision for optimisation.

In accordance with the present invention, a method of communicating between a user and a network, the method comprising registering with a first central control unit in a first area; registering with a second central control unit in a second area; wherein the second registration is valid concurrently with the first registration; defining a set of priorities by which each control unit determines route selection for a call; and routing a call via the first or second control unit accordingly.

The present invention allows a user to be registered with more than one central control unit simultaneously. The central control unit may be a gatekeeper in a network protocol, for example a GKH or GKV and a set of priorities are applied for route selection, so that the advantages of using either GKH or GKV are obtained as appropriate.

In certain circumstances it may be advantageous that the call is routed via both the first and the second control units. This would not be possible in the prior art systems, which require only one of GKH or GKV to be involved.

The invention is not limited to registration with two different network gatekeepers. For a user which moves frequently over a number of different networks, preferably the user registers with further central control units in further areas, which registrations are also valid concurrently with the first and second registration.

This allows the most effective routing to be used at any time and, for the case of emergency calls in particular, the user will always be connected with an emergency call station which is most appropriately located to provide assistance.

The present invention is applicable to any network or protocol which supports mobility, but preferably the network complies with H.323 standard.

Preferably, the set of route selection priorities includes at least one of dialled destination address; expected feature set; utilisation of capacity of central control units; failure of a central control unit; and own domain affiliation.

The mobile terminal may access the route selection priorities from a remote store, but preferably the route selection priorities are stored in a terminal rules table.

The use of multiple endpoint registration of intelligent flexible route selection as set out in the present invention is applicable both to enabling mobility of both terminals and users (e.g. where a user logs into an endpoint such as an IP phone or a personal computer) and also for redundancy purposes in fixed, non-mobile users, but preferably, the user is one of a mobile user or a mobile terminal.

An example of a method of communicating between a user and a network in accordance with the present invention will now be described with reference to the accompanying drawings in which.

Figure 1:
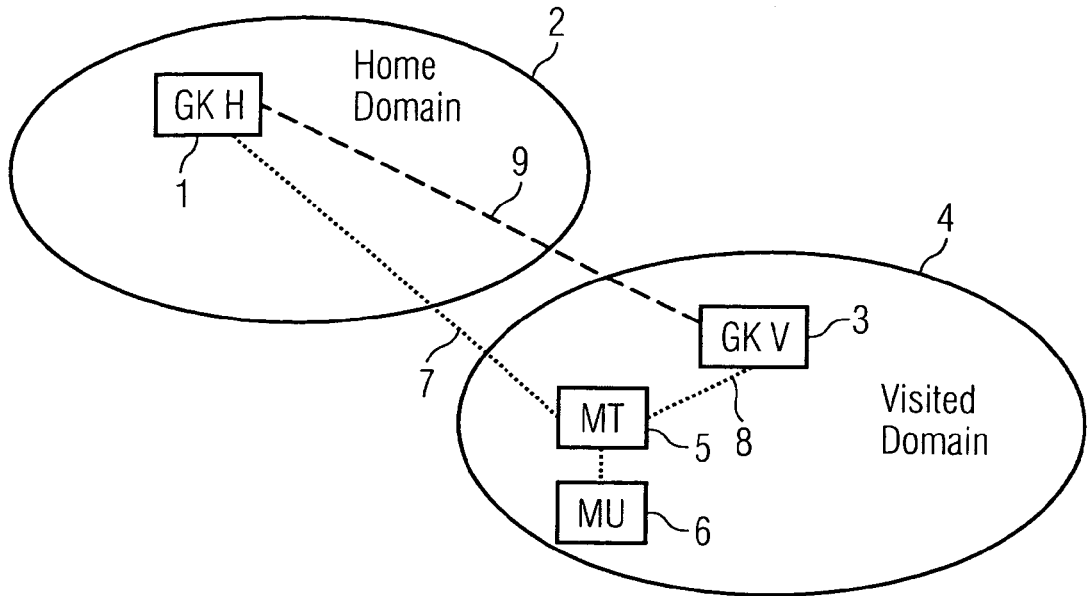
FIG. 1 illustrates an example of system architecture for a method according to the present invention.

The example system architecture of FIG. 1 comprises a home gatekeeper (GKH) 1 in a home domain 2 and a visited gatekeeper (GKV) 3 in a visited domain 4. A user, for example a mobile terminal (MT) 5 or mobile user (MU) 6, can register 7, 8 with the GKH 1 or the GKV 3 and the gatekeepers 1, 3 can communicate 9 with one another. Registration may be in accordance with ITU-T H.225.0 RAS.

Figure 2:
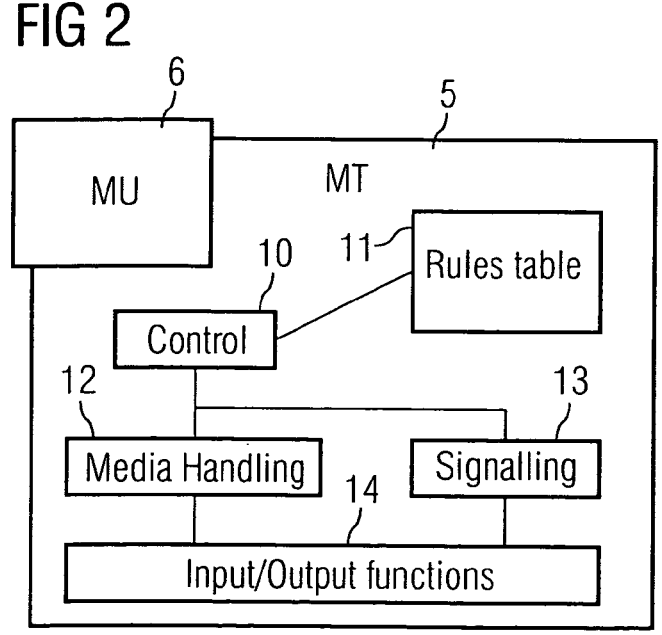
FIG. 2 shows an example of a functional block diagram of a mobile terminal with a registered mobile user for carrying out the method of the present invention.

FIG. 2 shows an example of a functional block diagram of the mobile terminal 5 with a registered mobile user 6. A controller 10 is coupled to a rules table 11, either embodied as part of the MT 5 or implemented externally, e.g. on a server (not shown) to which the terminal has access. The content of the rules table 11 will depend on the registered mobile user 6. The MT 5 has media handling 12, signalling 13 and input/output 14 functions.

Figure 3:
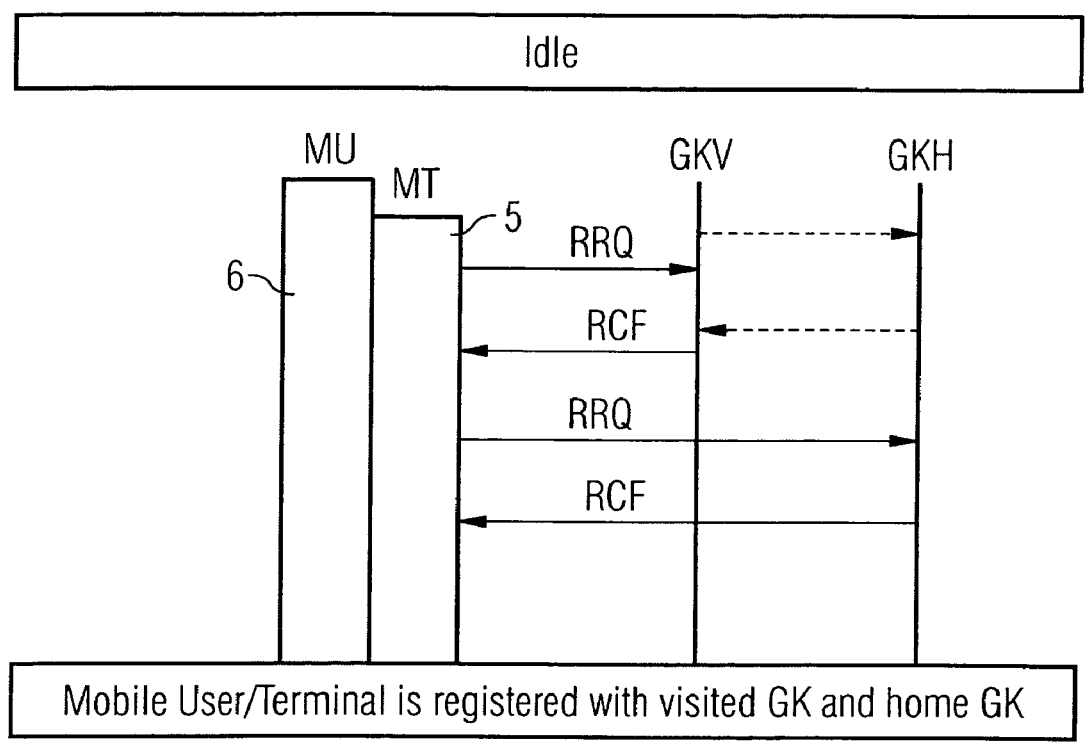
FIG. 3 is an example of a signalling sequence diagram for the method of the present invention.

In FIG. 3 a signalling sequence diagram is shown. Initially at idle, the MU/MT 6, 5 sends a registration request message (RRQ), such as ITU-T Standard H.225.0 (RAS) in the case of H.323 systems, to the GKV and any necessary communication between GKV and GKH uses inter-GK communication, e.g. in accordance with H.510. A registration confirm message (RCF) is sent back to the MT 5. This process is then applied for registering with the GKH by sending an RRQ to the GKH and receiving back an RCF, confirming that the MU/MT is registered with both the visited gatekeeper and the home gatekeeper.

Figure 4:
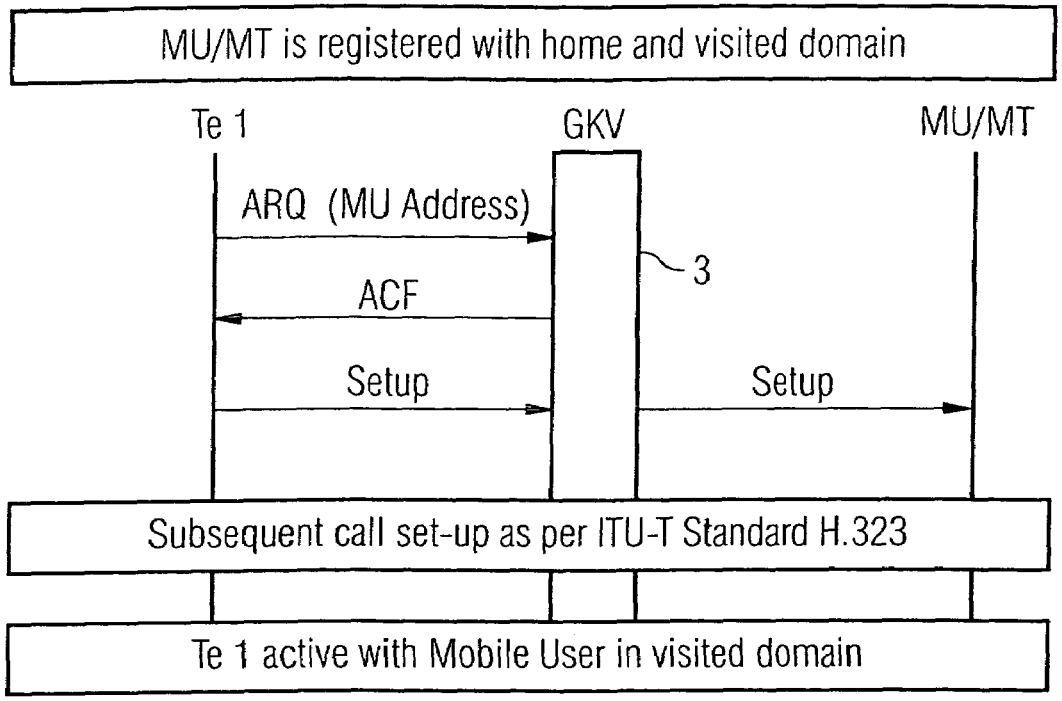
FIG. 4 illustrates an incoming call inside a visited domain.

Having successfully registered with both gatekeepers, the MU/MT is able to make or receive calls. FIG. 4 shows how the MU/MT receives a call while in a visited domain. A request is sent from a terminal Te 1 which is registered with the same gatekeeper using access request (ARQ) and giving the MU address. The GKV sends back an access confirmation (ACF) giving its own address. The terminal Te 1 then sets up a call to MU/MT 5, 6 via GKV 3. Alternatively, a request for a different gatekeeper could be sent with a location request (LRQ). Either way, the advantage lies in the fact that there is no need to contact the mobile user's home domain in order to put the call through, i.e. local handling by the GKV is sufficient.

Figure 5:
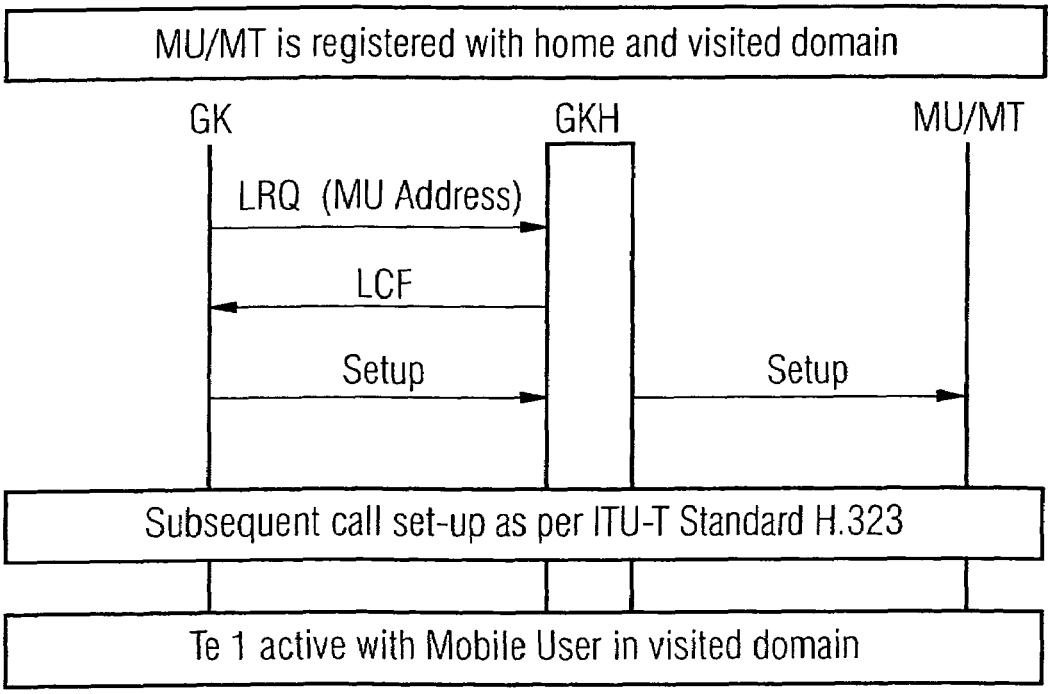
FIG. 5 illustrates an incoming call via a home domain.

In the next example, shown in FIG. 5, an MU/MT which is registered with both the home and visited domains receives a call via the home domain 2. A different gatekeeper GK sends a request to the GKH by means of an LRQ. The GKH responds with a location confirmation (LCF) with its own address. A call is then set-up via the GKH directly to MU/MT in the visited domain 4. This has the advantage that the mobile user's home domain 2 can put the call through directly to the mobile terminal MT 5 in the visited domain without having to involve the GKV 3.

Figure 6:
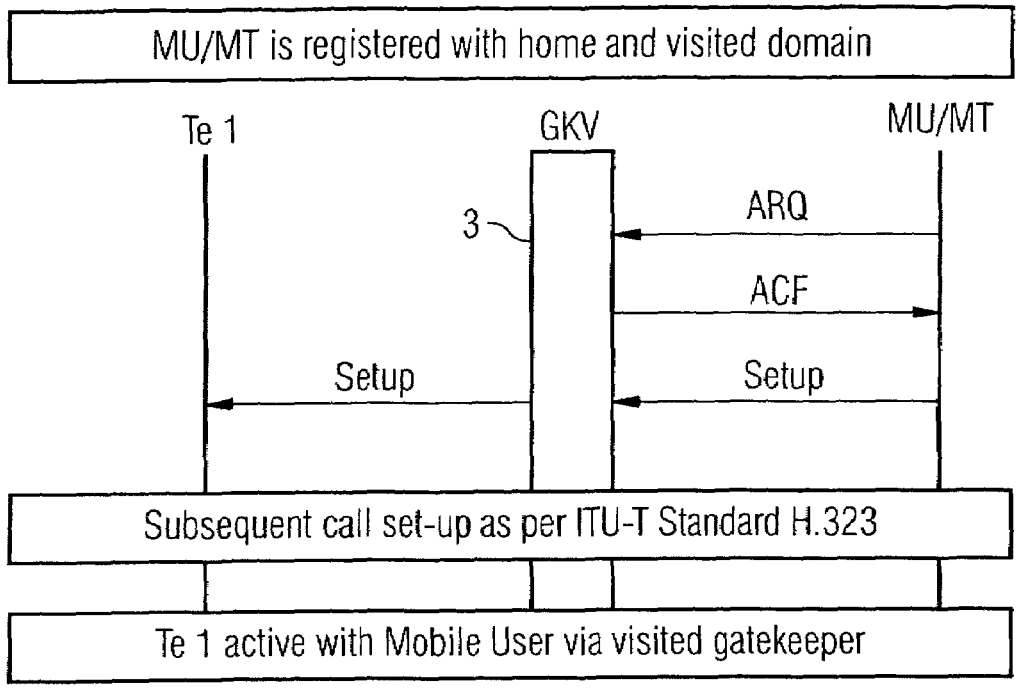
FIG. 6 illustrates an outgoing call made via a visited gatekeeper.

Next the MU/MT makes an outgoing call via the GKV. This is illustrated in FIG. 6. A request from MU/MT is sent to the GKV giving the address of Te 1 with which the MT wishes to communicate. According to the internal rules table 11, the MU/MT selects the visited gatekeeper for call set-up using ARQ, and the GKV responds with ACF with its own address. The MU/MT then sets up a call to Te 1 via the GKV. There is no need to contact the mobile user's home domain in order to set up the call, so efficient handling by the GKV is possible. The mobile terminal makes the decision to route the call in this way on the basis of its rules table.

Figure 7:
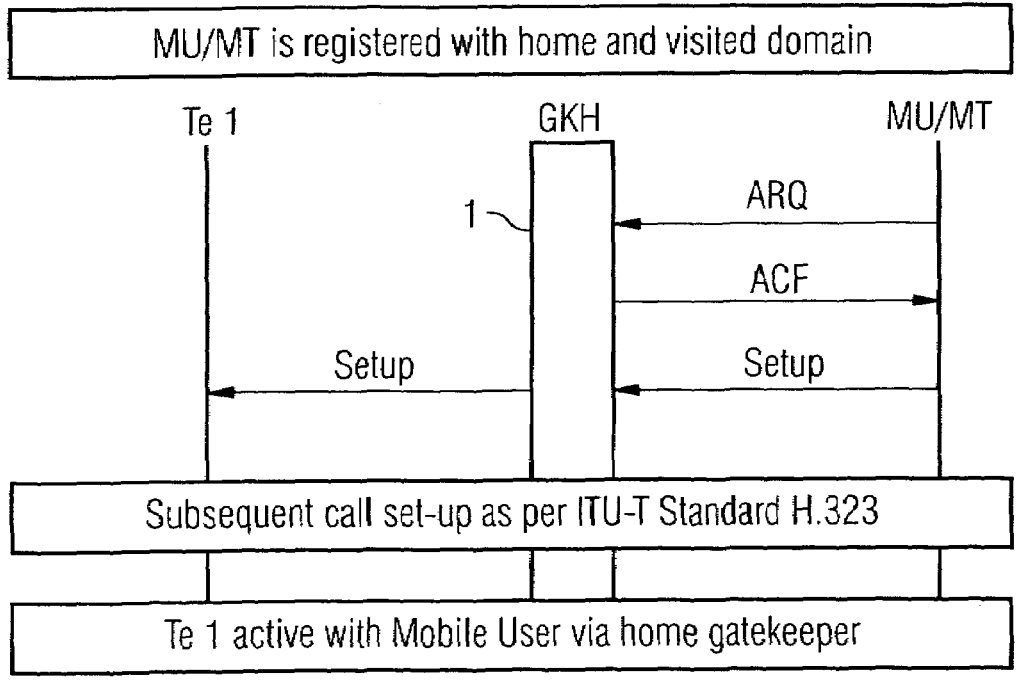
FIG. 7 illustrates call set up for an outgoing call made via a home gatekeeper.

Finally, FIG. 7 shows how the MU/MT can make an outgoing call via the home gate keeper. A request is sent from the MU/MT with the address of Te 1. According to internal rules table, MU/MT selects the home gatekeeper for call set-up (ARQ). The GKH responds with ACF with own address and the MU/MT sets up a call to Te 1 via the GKH. The call set-up can take place directly via the mobile user's home domain without having to go via the GKV, for example, if a necessary supplementary service is only available in the GKH.

In the examples described above the decision on how to route a call depends on specific criteria (described in more detail below) which are entered in the terminal rules table 11 (or which the terminal can access). The call set-up signalling is routed from the terminal either via the GKH or via the GKV, or via both the GKV and GKH. Thus, it is possible to make a decision in the terminal, dynamically and flexibly, depending on the specific conditions, as to whether it is advantageous to select routing via the GKH or GKV or via both these GKs. This makes it possible to maximise those scenarios for which the advantages of the two known methods described in the introduction can be put into effect. Those scenarios for which the disadvantages of the two known methods come into effect can be reduced to a minimum.

Typical criteria which the rules tables can take into account include the dialled destination address; the expected feature set (home features, visited domain features or features of both zones/domains); utilisation of capacity of the central control units (GK); failure of a central control unit (GK) and own domain affiliation. Other criteria may be included as appropriate. By registering a terminal (H.323, SIP, etc.) simultaneously with more than one GK and using intelligent rules in the rules table to influence route selection for signalling, e.g. for outgoing calls, the most efficient use is made of the network and any disadvantages minimised. Having registered with both a home and visited gatekeeper, both registrations are valid concurrently, rather than the user being forced to always use one or other, whether or not it is appropriate, as is the case in the prior art methods.

In order for the mobile user (User Mobility) or mobile terminal (Terminal Mobility) to log on in a visited zone or domain, the MU/MT is registered with both the visited GK and the home GK. The required registration information such as GK addresses can be received by the terminal using various methods, e.g. gatekeeper discovery procedures (finding a GK in a visited domain) as described in the standard H.323 Gatekeeper Discovery Procedure, or DNS-based methods and via administration in the terminal (e.g. GKH). The registration with GKH and GKV can take place in parallel or sequentially, but once registered both registrations are valid concurrently.

Outgoing calls where the user is in a visited zone or domain are routed by the terminal depending on specific criteria either via the GKH or the GKV, or via both GKs—the GKV and GKH (or vice versa). Using the example criteria of dialled destination address, then when the terminal rules table 11 recognises an address as being in the home domain, the routing takes place via the GKH. This has the advantages that all home features are available; routing to the home domain would have to take place anyway, so there are no disadvantageous signalling paths which need to be prevented. If the dialled destination address is recognised in the terminal rules table as an emergency call number (e.g. 110, 911), then the call will be set up via the GKV to ensure that the geographically nearest emergency station is contacted.

In an example where the dialled destination address is detected in the terminal rules table 11 as an address in the visited domain in which the terminal is currently located, then the rule may specify routing via the GKV in order to avoid effects such as trombone connections. This is particularly relevant where geographical distances between the GKV and GKH are large. A comparison of the home domain with the visited domain may also result in this rule assessment result.

In other cases the rule assessment may dictate routing via the home GK if the advantage of the usable home features is assessed as greater than the disadvantage of "rerouting signalling" via the home. For individual users (User Groups), the rule may always specify routing via home in order to always be able to use specific home features. One criterion could be that there is a requirement to use both home as well as visited domain features. In this case, the rule assessment in the terminal for an outgoing call may result in routing via both GKs (GKV→GKH) (source routing). For example, a "discard" feature could be implemented only in the GKV and be used for that call. Alternatively, for instance, a call forward rerouting feature might be executed only by the GKH. This means that a superset of features is therefore available.

One criterion could be that the capacity of one of the two GKs was fully utilised. Beyond a specific GK capacity utilisation limit value, the rule could specify routing only via the alternative GK. If one of the two GKs has failed, the simple rule specifies further routing only via the active GK. The home address, home zone affiliation or home domain affiliation, or data specific to these in relation to the destination address data could result in a specific rule.

Options for incoming calls are that they are always presented via the home GK; or that if, at the time the terminal is registered with the visited GK, there is a corresponding message from the GKV to the GKH, incoming calls in the home zone of that terminal/user could also be presented via the visited GK.

As well as the "mobility" scenario, the use of terminal multiple registration described also has advantages in terms of general fault-tolerance (redundancy) applications. If a GK (SIP proxy, etc.) fails, the terminal remains serviceable for outgoing and incoming calls because an additional registration remains active. At the time GK1 fails, there is no need to look for an alternative GK. In this case, for example, the simple rule in the rules table in the terminal specifies "use GK A—if GK A is not available use GK B". The invention is not limited to having only two registrations. If a user will regularly operate in more than one visited domain, then it can be registered in more than one visited domain and the rules table must be adapted to take account of this.

The rules table can also be implemented outside the terminal. In this case the terminal can access the rules table, i.e. the terminal interacts with the rules table which is implemented on a server for instance. The invention is applicable to both standardised registration methods (e.g. H.323, SIP), and proprietary protocols such as. CorNet TC Logon.

The invention claimed is:

1. A method of communicating between a user and a network, the method comprising
   registering with a home control unit in a home domain;
   registering with a visited control unit in a in a visited domain, wherein the second registration is valid concurrently with the first registration;
   defining a set of priorities by which each of the home and visited control units determines route selection for a call; and
   routing a call via the home or visited control unit in accordance with the set of priorities, wherein when the call is an incoming call to the user, route selection is performed by one of the home or visited control unit, and when the call is an outgoing call from the user, route selection is performed by both the user and one of the home or visited control units.

2. A method accord to claim 1, wherein the user registers with further control units in further areas, which registrations are also valid concurrently with the first and second registration.

3. A method according to claim 1, wherein the home and visited control units are gatekeepers in a network protocol.

4. A method according to claim 1, wherein the network complies with H.323 standard.

5. A method according to claim 1, wherein the set of route selection priorities includes at least one of dialed destination address; expected feature set; utilization of capacity of control units; failure of a control unit; and own domain affiliation.

6. A method according to claim 1, wherein the route selection priorities are stored in a terminal rules table.

7. A method according to claim 1, wherein the user comprises one of a mobile user and a mobile terminal.

8. The method according to claim 1, wherein the home control unit is a home gatekeeper and the visited control unit is a visited gatekeeper.

9. A method of communicating between a user and a network, the method comprising:
   registering with a first central control unit in a first area;
   registering with a second central control unit in a second area, wherein the second registration is valid concurrently with the first registration;
   defining a set of priorities by which each control unit determines route selection for a call; and
   routing a call via the first or second control unit,
   wherein when the call is an incoming call to the user, route selection is performed by one of the control units, and when the call is an outgoing call from the user, route selection is performed by both the user and one of the control units.

10. A method according to claim 9, wherein the call is routed via both the first and the second control units.

11. A method accord to claim 9, wherein the user registers with further control units in further areas, which registrations are also valid concurrently with the first and second registration.

12. A method according to claim 9, wherein the central control units are gatekeepers in a network protocol.

13. A method according to claim 9, wherein the network complies with H.323 standard.

14. A method according to claim 9, wherein the set of route selection priorities includes at least one of dialed destination address; expected feature set; utilization of capacity of central control units; failure of a central control unit; and own domain affiliation.

15. A method according to claim 9, wherein the route selection priorities are stored in a terminal rules table.

16. A method according to claim 9, wherein the user comprises one of a mobile user and a mobile terminal.

* * * * *